No. 713,583. Patented Nov. 11, 1902.
J. E. WOODBRIDGE.
CONNECTION FOR MEASURING INSTRUMENTS.
(Application filed Mar. 26, 1902.)

(No Model.)

Witnesses.

Inventor.
Jonathan E. Woodbridge.
by Albert G. Davis
Atty.

United States Patent Office.

JONATHAN E. WOODBRIDGE, OF ALBANY, NEW YORK, ASSIGNOR TO GENERAL ELECTRIC COMPANY, A CORPORATION OF NEW YORK.

CONNECTION FOR MEASURING INSTRUMENTS.

SPECIFICATION forming part of Letters Patent No. 713,583, dated November 11, 1902.

Application filed March 26, 1902. Serial No. 100,096. (No model.)

*To all whom it may concern:*

Be it known that I, JONATHAN E. WOODBRIDGE, a citizen of the United States, residing at Albany, county of Albany, State of New York, have invented certain new and useful Improvements in Systems of Connection for Measuring Instruments, (Case No. 2,132,) of which the following is a specification.

The object of my present invention is to reduce the number of connections necessary for a plurality of measuring instruments for a multiphase system and where transformers are used in connection with such instruments to reduce the number of transformers required.

The novel features which I believe characterize my invention are set forth with particularity in the appended claims, the invention itself being described in connection with the accompanying drawings, in which—

Figure 1:
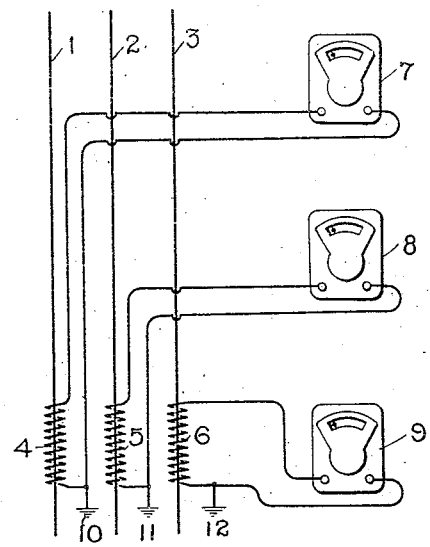
Figure 2:
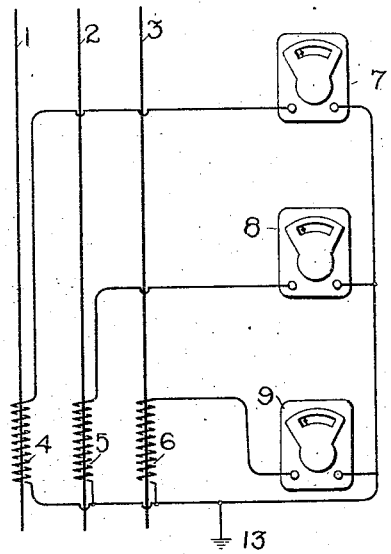

Figure 1 represents a practice heretofore followed for connecting up measuring instruments for a three-phase alternating-current system; Fig. 2, a transition step between the old arrangement shown in Fig. 1 and the arrangement shown in Fig. 3, which sets forth one feature of my invention; and Fig. 4, an extension of my invention whereby the number of transformers for use in connection with the measuring instruments is reduced.

In the drawings I have represented my invention as applied to a three-phase alternating-current system. It has heretofore been customary where the currents in the three legs of the system are to be measured to provide each leg or main with a current-transformer having its primary in series with the main and its secondary connected to the terminals of an ammeter. In order to remove the static charges which would otherwise reach the switchboard and prove objectionable to the attendants, it was formerly the practice to ground one terminal of the secondary of each of these current-transformers. The system of connections thus briefly mentioned, therefore, includes two leads for each ammeter, making six leads in all, together with three ground connections for the several secondaries of the current-transformers.

Inasmuch as the three ground connections operate to electrically connect one of the two leads of each pair of ammeter-leads, one of the three return-wires for the ammeters may be used as a common return. Inasmuch, however, as the common return in a secondary three-phase system carries no current when the primary system has no common return, this wire also may be omitted, thereby permitting the number of leads for the three ammeters to be reduced from six to three.

Figure 3:
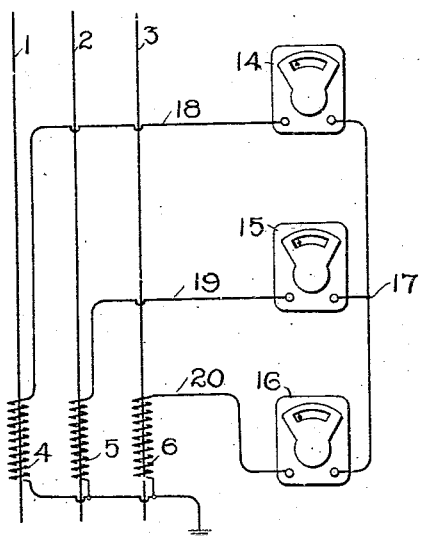
Figure 4:
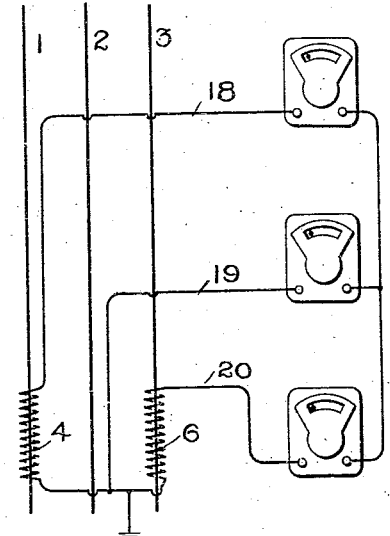

Fig. 1 represents the old arrangement above referred to, the three mains of the three-phase system being indicated at 1, 2, and 3, the three current-transformers therefor at 4, 5, and 6, and the ammeters connected to the secondaries of these transformers at 7, 8, and 9. One terminal of each secondary is grounded, as indicated at 10, 11, and 12, respectively. These ground connections operate to produce a Y connection between the three ammeter-leads from which the ground connections are made. Instead, therefore, of connecting one of each pair of ammeter-leads separately to ground, as in Fig. 1, it will be seen that the electrical conditions are not changed if the three leads are connected to each other and then by a single connection to ground, as represented at 13 in Fig. 2. This connection results in a reduction of the leads for the ammeters from six to four, and the number of leads may be still further reduced by entirely omitting the return-conductor 13, since this conductor carries no current, and therefore can serve no useful purpose. The resulting arrangement is shown in Fig. 3, in which the three ammeters 14, 15, and 16 have a lead of each connected to a common point 17. The ammeter-leads (represented at 18, 19, and 20) are now three in number, as compared with six, as shown in Fig. 1, representing the former practice.

Inasmuch as one of the mains of the three-phase system carries current which is a resultant of currents in the other two mains of the system, I have found that advantage may be taken of this fact to eliminate one of the three current-transformers represented at 4, 5, and 6 in Fig. 3. Any one of these transformers may be omitted without interfering with the operation of the instruments or ammeters 14, 15, and 16, and in Fig. 4 I have represented an arrangement differing from Fig. 3 only in that the transformer 5, for example, has been omitted. The main 19, into which the secondary of this transformer 5 was formerly connected, still carries current which varies in proportion to the current in the main 2, owing to the fact that it constitutes a return-circuit for currents of such values and such phase relations as correspond to the currents in the other mains 1 and 3.

The invention is not limited to use in connection with three-phase systems, but is applicable to other systems as well and is operative regardless as to whether the system is balanced or unbalanced.

What I claim as new, and desire to secure by Letters Patent of the United States, is—

1. The combination of a multiphase alternating-current system, current-transformers for mains of said system, interconnected leads extending from the secondaries of said transformers, and measuring instruments in said leads.

2. The combination of a multiphase alternating-current system, current-transformers therefor, a grounded and interconnected system of leads connected to the secondaries of said transformers, and measuring instruments in said leads.

3. The combination with the mains of a multiphase alternating-current system, of current-transformers for less than the whole number of mains, an interconnected system of leads for the secondaries of said transformers, and measuring instruments in said leads.

4. The combination with the mains of a multiphase alternating-current system, of current-transformers for less than the whole number of mains, a grounded and interconnected system of leads for the secondaries of said transformers, and measuring instruments in said leads.

5. The combination with the mains of a multiphase alternating-current system, of means for measuring the current in one of the mains, consisting of a measuring instrument and a system of circuits for passing through said instrument a current due to the resultant action of currents in other mains of said system.

6. The combination with the mains of a three-phase alternating-current system, of a system of Y-connected leads, two transformers for conveying three-phase currents inductively from said mains to said leads, and measuring instruments for one or more of said leads.

7. The combination with the mains of a three-phase alternating-current system, of a system of grounded Y-connected leads, two transformers for conveying three-phase currents inductively from said mains to said leads, and measuring instruments for one or more of said leads.

8. The combination with a multiphase alternating-current system, of current-transformers for all but one of the mains of said system, interconnected leads extending from the secondaries of said transformers, and measuring instruments in said leads.

9. The combination with the mains of a three-phase alternating-current system, of current-transformers for two of the mains of said system, an electrical connection between a terminal of the secondary of one of said transformers and a terminal of the secondary of the other transformer, leads extending from the free terminals of said secondaries and from said connection, said leads being connected together at a common point, and a measuring instrument inserted in each of said leads.

In witness whereof I have hereunto set my hand this 25th day of March, 1902.

JONATHAN E. WOODBRIDGE.

Witnesses:
BENJAMIN B. HULL,
HELEN ORFORD.